United States Patent [19]

Oda et al.

[11] Patent Number: 5,060,743

[45] Date of Patent: Oct. 29, 1991

[54] FOUR-WHEEL STEERING SYSTEM FOR AUTOMOTIVE VEHICLES

[75] Inventors: Susumu Oda, Toyota; Masami Aga; Takashi Kajiwara, both of Susono; Naoki Tajima, deceased, late of Nagoya, by Chisako Tajima, heir; all of Japan

[73] Assignee: Toyota Jidosha Kabushiki Kaisha, Aichi, Japan

[21] Appl. No.: 372,461

[22] Filed: Jun. 28, 1989

[30] Foreign Application Priority Data

Jun. 29, 1988 [JP] Japan ............................ 63-162006

[51] Int. Cl.[5] ............................................. B62D 5/06
[52] U.S. Cl. ................................. 180/140; 180/132; 280/91
[58] Field of Search ............... 180/140, 141, 143, 132; 280/91

[56] References Cited

U.S. PATENT DOCUMENTS 4,657,102 4/1987 Kanazawa et al. ................ 180/140
4,860,845 8/1989 Janson ................................. 180/140

FOREIGN PATENT DOCUMENTS 6092669 6/1985 Japan .

Primary Examiner—Charles A. Marmor
Assistant Examiner—Alan M. Kagen
Attorney, Agent, or Firm—Oliff & Berridge

[57] ABSTRACT

A four-wheel steering system for an automotive vehicle includes a front wheel steering mechanism operable in response to a steering effort applied thereto to steer a pair of dirigible front road wheels, a rear wheel steering mechanism arranged to steer a pair of dirigible rear road wheels in response to steerage of the front road wheels, and a control apparatus arranged to control the rear wheel steering mechanism in such a manner that the rear road wheels are retained in their neutral positions when the front road wheels are steered at an angle less than a predetermined small angle and that the rear road wheels are steered in an opposite direction relative to the front road wheels when the front road wheels are steered at a larger angle than the predetermined small angle. The control apparatus is further arranged to control the rear wheel steering mechanism in such a manner that a changing rate of the rear wheel steering angle per a unit steering angle of the front road wheels increases in accordance with an increase of the front wheel steering angle.

4 Claims, 5 Drawing Sheets

FOUR-WHEEL STEERING SYSTEM FOR AUTOMOTIVE VEHICLES

BACKGROUND OF THE INVENTION

1. Field of the Invention

The present invention relates to a steering system for automotive vehicles, and more particularly to a four-wheel steering system including a front wheel steering mechanism operable in response to a steering effort applied thereto to steer a pair of dirigible front road wheels and a rear wheel steering mechanism arranged to steer a pair of dirigible rear road wheels in response to steerage of the front road wheels.

2. Description of the Prior Art

In Japanese Utility Model Early Publication No. 60-92669, there has been proposed such a four-wheel steering system as described above, wherein the rear wheel steering mechanism is controlled to retain the rear road wheels in their neutral positions when the turn angle of the steering wheel is less than a predetermined small angle and to steer the rear road wheels in an opposite direction relative to the front road wheels when the turn angle of the steering wheel is larger than the predetermined small angle. Under such control of the rear wheel steering mechanism, however, the rear wheel steering angle is steppedly increased at a constant changing rate in accordance with an increase of the turn angle of the steering wheel. It is, therefore, apparent that if the changing rate of the rear wheel steering angle relative to the front wheel steering angle was determined in a small value, the rear road wheels would not be steered at a desired angle even when the front road wheels are steered at a larger angle than the predetermined small angle. This deteriorates the smaller turning ability of the vehicle. If the changing rate of the rear wheel steering angle was determined in a large value to enhance the smaller turning ability of the vehicle, the rear road wheels would be steered in excess when the front road wheels are steered from their neutral positions. This causes a great change in behavior of the vehicle and deteriorates the turning ability of the vehicle.

SUMMARY OF THE INVENTION

It is, therefore, a primary object of the present invention to provide a control apparatus for the rear wheel steering mechanism which is capable of enhancing the smaller turning ability of the vehicle and of ensuring the stable turning ability of the vehicle without causing any problems described above.

According to the present invention, the primary object is attained by providing a four-wheel steering system for an automotive vehicle which comprises a front wheel steering mechanism operable in response to a steering effort applied thereto to steer a pair of dirigible front road wheels, a rear wheel steering mechanism arranged to steer a pair of dirigible rear road wheels in response to steerage of the front road wheels, and a control apparatus arranged to control the rear wheel steering mechanism in such a manner that the rear road wheels are retained in their neutral positions when the front road wheels are steered at an angle less than a predetermined small angle and that the rear road wheels are steered in an opposite direction relative to the front road wheels when the front road wheels are steered at a larger angle than the predetermined small angle, wherein the control apparatus is further arranged to control the rear wheel steering mechanism in such a manner that a changing rate of the rear wheel steering angle per a unit steering angle of the front road wheels increase in accordance with an increase of the front wheel steering angle.

Under such control of the rear wheel steering mechanism, the rear wheel steering angle is maintained at a zero value when the front road wheels are steered at an angle less than the predetermined small angle during travel of the vehicle at a high speed. When the front road wheels are steered at a larger angle than the predetermined small angle during travel of the vehicle at a medium or low speed, the rear wheel steering angle gradually increases from the zero value in accordance with an increase of the front wheel steering angle.

BRIEF DESCRIPTION OF THE DRAWINGS

Other objects, features and advantages of the present invention will become more readily apparent from the following detailed description of preferred embodiments thereof when taken together with the accompanying drawings, in which.

DESCRIPTION OF THE PREFERRED EMBODIMENTS

Figure 1:
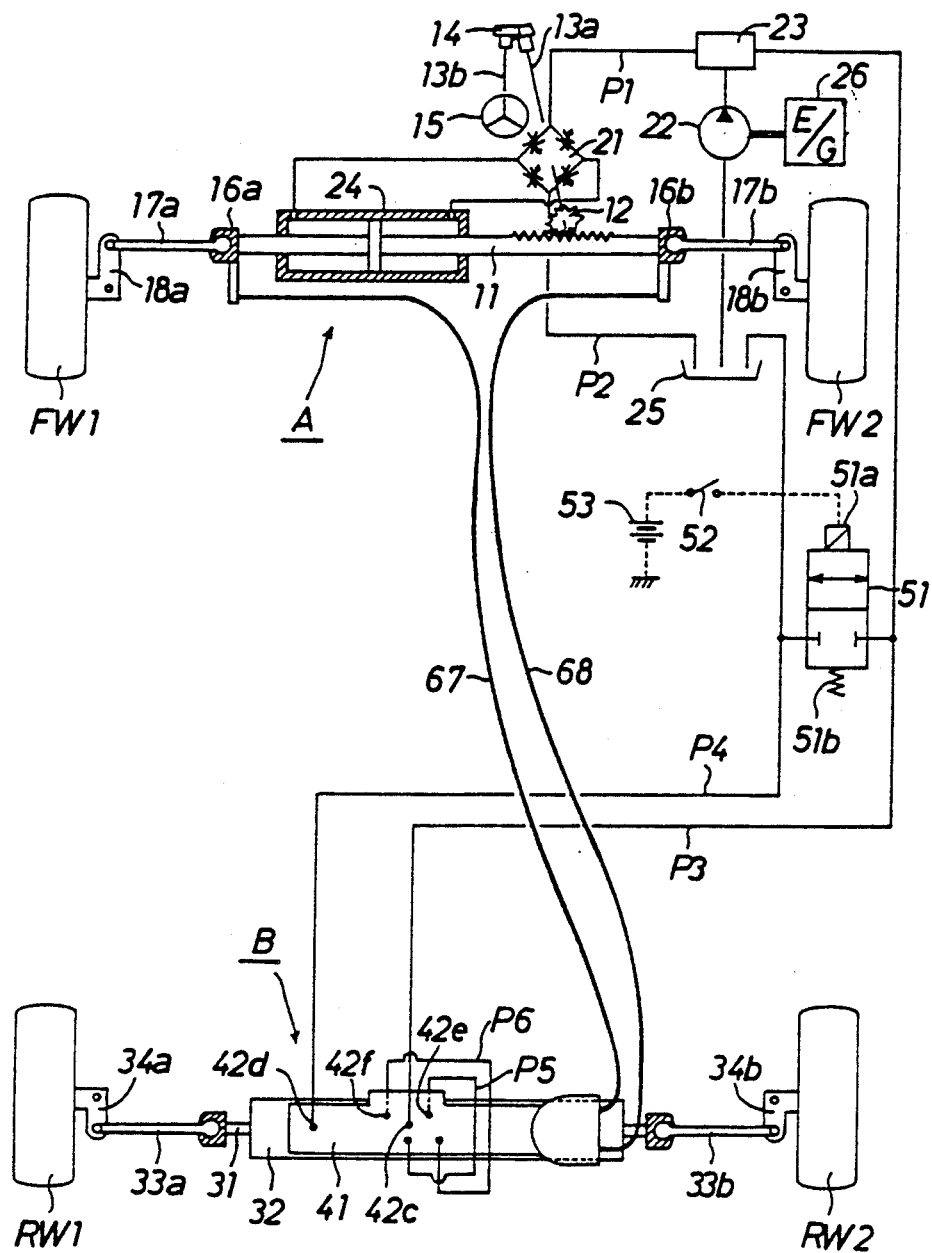
FIG. 1 is a schematic plan view of an automotive vehicle equipped with a four-wheel steering system in accordance with the present invention.

In FIG. 1 of the drawings, there is schematically illustrated an automotive vehicle equipped with a four-wheel steering system which comprises a front wheel steering mechanism A arranged to steer a pair of dirigible front road wheels $FW_1$, $FW_2$ and a rear wheel steering mechanism B arranged to steer a pair of dirigible rear road wheels $RW_1$, $RW_2$ in response to steerage of the front road wheels $FW_1$, $FW_2$.

The front wheel steering mechanism A is in the form of a well-known steering mechanism which includes a lateral rack bar 11 arranged to be axially displaced by operation of a steering wheel 15, a pair of tie rods 17a, 17b each connected to opposite ends of the rack bar 11 by means of a pair of rack ends 16a, 16b, and a pair of knuckle arms 18a, 18b each connected to the tie rods 17a, 17b to steer the front road wheels $FW_1$, $FW_2$ in response to axial displacement of the rack bar 11. The rack bar 11 is operatively connected to the steering wheel 15 through a pinion gear 12, a lower steering shaft 13a, intermeshed bevel gears 14 and an upper steering shaft 13b. The lower steering shaft 13a is provided thereon with a control valve 21 in the form of a four way valve which is responsive to the driver's steering effort applied thereto through steering shafts 13a, 13b to control the flow of hydraulic fluid under pressure supplied into a hydraulic power cylinder 24 from a hydraulic pump 22 through a flow dividing valve 23 and a conduit $P_1$ and to control the flow of hydraulic fluid discharged from the power cylinder 24 into a fluid reservoir 25 through a conduit $P_2$. The hydraulic pump 22 is driven by a prime mover 26 of the vehicle, and the power cylinder 24 is activated under control of the hydraulic fluid to cause axial displacement of the rack bar 11 to assist steerage of the front road wheels $FW_1$, $FW_2$.

Figure 2:
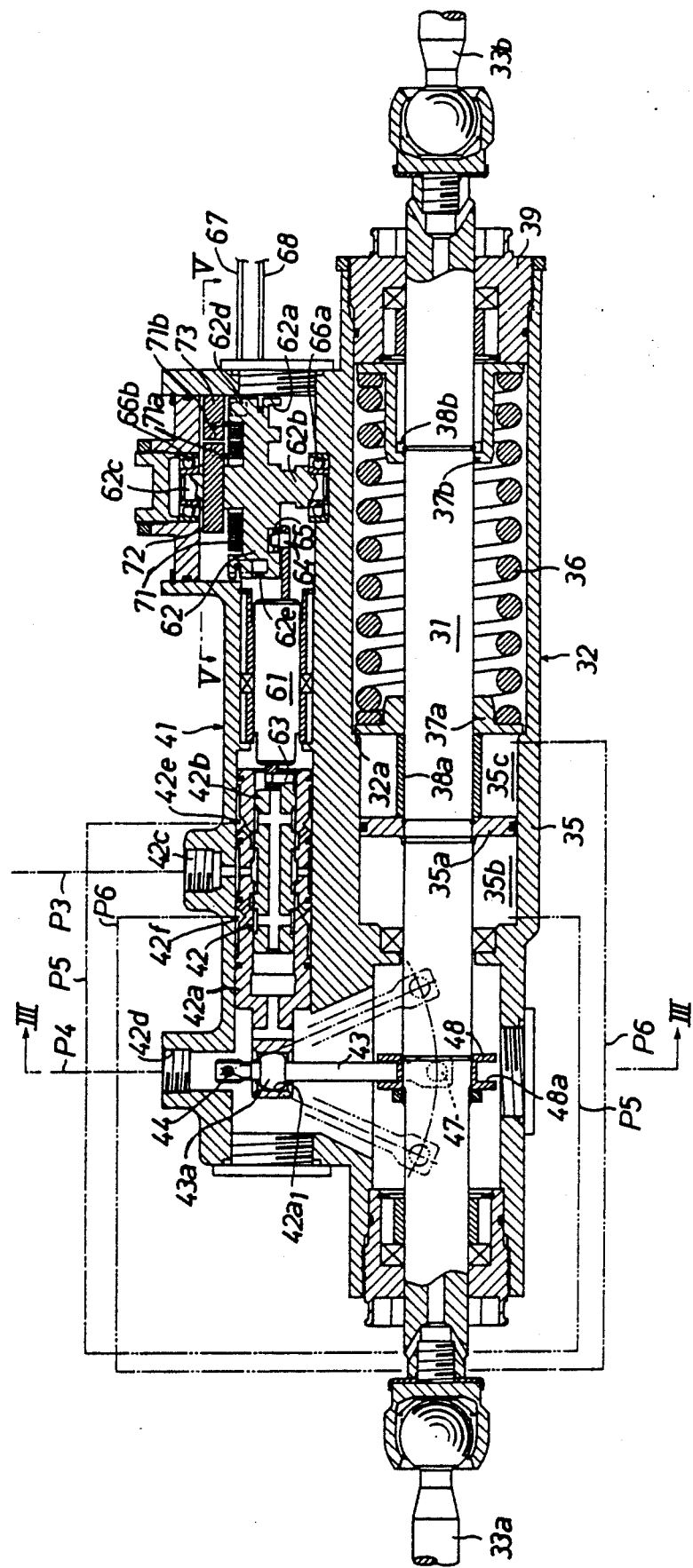
FIG. 2 is an enlarged sectional elevation of a rear wheel steering mechanism shown in FIG. 1.

As shown in FIGS. 1 and 2, the rear wheel steering mechanism B includes a lateral rod 31 arranged within a housing 32 to be axially displaced, a pair of tie rods 33a, 33b each connected to opposite ends of lateral rod 31, a pair of knuckle arms 34a, 34b each connected to the tie rods 33a, 33b to steer the rear road wheels $RW_1$, $RW_2$ in response to axial displacement of the lateral rod 31. The housing 32 is fixedly mounted on a body structure of the vehicle. As shown in FIG. 2, the housing 32 is formed to contain therein a hydraulic power cylinder 35 for effecting axial displacement of the lateral rod 31 and a coil spring 36 applied with a preload for biasing the lateral rod 31 toward its neutral position. The power cylinder 35 includes a power piston 35a axially movably disposed within the housing 32 to form a pair of fluid chambers 35b and 35c. The power piston 35a is fixed to the lateral rod 31 to effect axial displacement of the lateral rod 31 in accordance with hydraulic fluid under pressure selectively supplied into the fluid chamber 35b or 35c. The coil spring 36 is assembled in surrounding relationship with the lateral rod 31 and supported in place by engagement with a pair of axially spaced annular retainers 37a, 37b. The left-hand annular retainer 37a is retained in place by engagement with an internal annular shoulder 32a of housing 32 and is engaged with the power piston 35a through a sleeve member 38a in such a manner as to permit leftward movement of the lateral rod 31. The right-hand annular retainer 37b is retained in place by engagement with the inner end of a closure plug 39 threaded into an end portion of housing 32 and is engaged with a retainer ring 38b fixed to the lateral rod 31 in such a manner as to permit rightward movement of the lateral rod 31.

The housing 32 is integrally formed thereon with a second housing 41 which contains therein a spool valve assembly 42. The spool valve assembly 42 includes a valve sleeve 42a axially movably disposed within the second housing 41 and a valve spool 42b axially movably disposed within the valve sleeve 42a. The valve spool 42b cooperates with the valve sleeve 42a to selectively supply the hydraulic fluid under pressure into the power cylinder 35 from the hydraulic pump 22. The valve sleeve 42a is operatively connected at its left end to the lateral rod 31 by means of a swingable lever 43.

Figure 3:
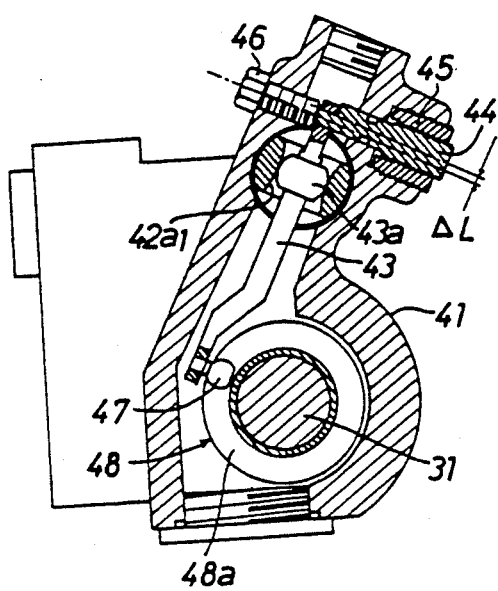
FIG. 3 is a cross-sectional view taken along line III—III in FIG. 2.

As shown in FIGS. 2 and 3, the swingable lever 43 is rotatably supported at its upper end by means of a support pin 44 to be swung leftward or rightward in response to axial displacement of the lateral rod 31. As shown in FIG. 3, the support pin 44 is threaded into an adjustable fastening nut 45 which is threaded into a periperal wall of second housing 41. The fulcrum of swingable lever 43 is displaced in a distance $\Delta L$ from the rotation center of support pin 44. Thus, the fulcrum of swingable lever 43 can be slightly adjusted by rotation of the support pin 44 in a leftward or rightward direction in the figure. When the support pin 44 has been axially displaced by its rotation, the fastening nut 45 is rotated to fasten the support pin 44 in place. A screw 46 threaded into the housing 41 is engaged with the inner end of support pin 44 to retain the swingable lever 43 in place. The swingable lever 43 has an enlarged pivot portion 43a formed with a spherical surface for engagement with a corresponding bore $42a_1$ in the left end portion of valve sleeve 42a. A pin 47 fixed to the lower end of swingable lever 43 is engaged with an annular groove 48a of a sleeve member 48 fixed to the lateral rod 31.

As shown in FIGS. 1 and 2, the second housing 41 is provided with an inlet port 42c, an exhaust port 42d, and distribution ports 41e, 42f. The inlet port 42c is connected to the flow dividing valve 23 by way of a conduit $P_3$, while the exhaust port 42d is connected to the fluid reservoir 25 by way of a conduit $P_4$. Disposed between the conduits $P_3$, $P_4$ is an electromagnetic changeover valve 51 which is provided with a solenoid 51a and a spring 51b. (see FIG. 1) When the solenoid 51a is deenergized, the changeover valve 51 is maintained in a first condition under the load of spring 51b to disconnect the conduit $P_1$ from the conduit $P_3$. When the solenoid 51a is energized, the changeover valve 51 is maintained against the load of spring in a second condition to provide a direct fluid communication between the conduits $P_3$ and $P_4$. The solenoid 51a of changeover valve 51 is connected to a vehicle battery 53 through a cancel switch 52 of the normally open type. Thus, the solenoid 51a is energized only when the cancel switch 52 has been closed. The distribution ports 42e and 42f are connected to the fluid chambers 35b and 35c of power cylinder 35 through conduits $P_5$ and $P_6$, respectively.

Figure 4:
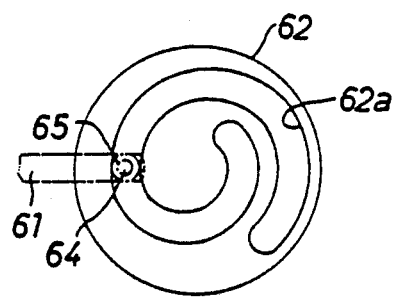
FIG. 4 illustrates the bottom face of a cam plate shown in FIG. 2.
Figure 6:
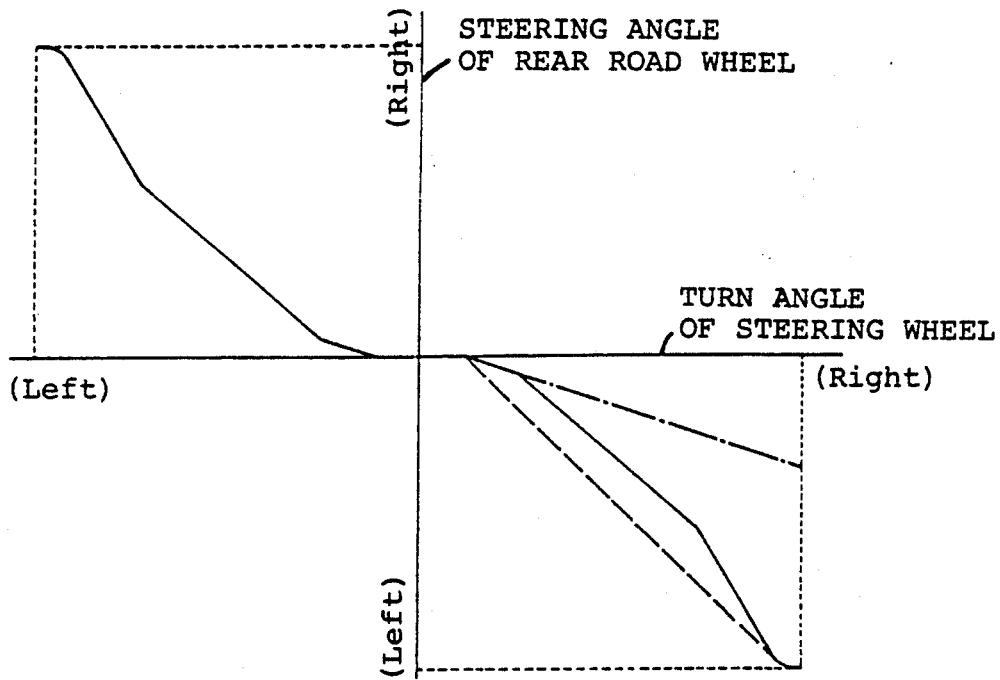
FIG. 6 is a graph showing a relationship between a turn angle of a steering wheel and a steering angle of rear road wheels.

The valve spool 42b is connected to a connecting rod 61 to be axially displaced by rotation of a cam plate 62. The connecting rod 61 is axially movably disposed within the second housing 41 and connected at its one end to the valve spool 42b by means of a pin 63. A pin 64 is fixed to the other end of connecting rod 61 and engaged through a ball bearing 65 with a cam groove 62a formed in the bottom face of cam plate 62. The cam plate 62 is in the form of a disc plate which is integrally formed at its center with upper and lower shaft parts 62b and 62c. The shaft parts 62b and 62c are rotatably supported on the second housing 41 through ball bearings 66a and 66b to support the cam plate 62 in place. As shown in FIG. 4, the cam groove 62a of plate 62 is formed spirally to cause axial displacement of the connecting rod 61 in accordance with clockwise or counterclockwise rotation of the cam plate 62, as shown by a solid characteristic line in FIG. 6. In a condition where the cam plate 62 is maintained in an initial position to retain the pin 64 and ball bearing 65 as shown in FIG. 4, the connecting rod 61 is retained in a neutral position. Even when the cam plate 62 is rotated from the initial position in a clockwise or counterclockwise direction at a small angle less than a predetermined angle, the connecting rod 61 is still retained in the neutral position. When the rotation angle of cam plate 62 exceeds the predetermined angle, the rate of axial displacement of the connecting rod 61 per a unit rotation angle of the cam plate increases at three steps as shown in FIG. 6. When the rotation angle of cam plate 62 is maximized, the rate of axial displacement of the connecting rod becomes a maximum value.

Figure 5:
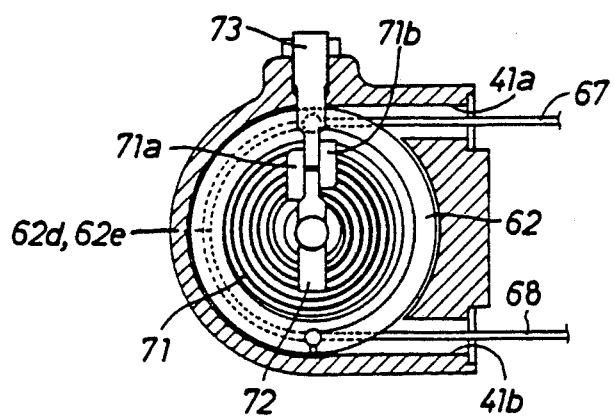
FIG. 5 is a cross-sectional view taken along line V—V in FIG. 2.

As shown in FIG. 5, a pair of vertically spaced annular grooves 62d and 62e are formed in an outer periphery of cam plate 62 to receive therein a pair of cables 67 and 68 which are fixed at their rear ends to the cam plate 62 to rotate the cam plate 62 in response to steerage of the front road wheels $FW_1$, $FW_2$. The cables 67, 68 are extended outwardly from the second housing 41 through holes 41a, 41b and supported on an appropriate portion of the vehicle body structure to extend in a forward direction. Thus, as shown in FIG. 1, the cables 67, 68 are connected at their front ends to the rack ends 16a, 16b of front wheel steering mechanism A. As clearly shown in FIG. 5, a spiral spring 71 is mounted on the cam plate 62 in surrounding relationship with the shaft part 62c of plate 62. The spiral spring 71 has inner and outer ends 71a and 71b which are bent upward and engaged with a lever 72 and a stationary member 73, respectively. The lever 72 is fixed to the cam plate 62, while the stationary member 73 is fixed to the second housing 41. Thus, the cam plate 62 is loaded by the spiral spring 71 toward the initial position.

Hereinafter, the operation of the four-wheel steering system will be described in detail. Assuming that the cancel switch 52 is maintained in an open position, the changeover valve 51 is maintained in the first condition to block the direct fluid communication between the conduits $P_3$ and $P_4$. Thus, the hydraulic fluid under pressure from pump 22 is supplied into the inlet port 42c of spool valve 42 through the flow dividing valve 23 and conduit $P_3$ to steer the rear road wheels $RW_1$, $RW_2$ in response to steerage of the front road wheels $FW_1$, $FW_2$. When the steering wheel 15 is turned rightward, the lateral rack bar 11 is displaced rightward by the driver's steering effort applied thereto through the steering shafts 13a, 13b. The rightward displacement of rack bar 11 is transmitted to the front road wheels $FW_1$, $FW_2$ through the tie rods 17a, 17b and knuckle arms 18a, 18b to steer the front road wheels in a rightward direction. In this instance, the control valve 21 is operated to supply the hydraulic fluid under pressure from the flow dividing valve 23 into the left-hand fluid chamber of power cylinder 24 therethrough and to discharge therethrough hydraulic fluid from the right-hand fluid chamber of power cylinder 24 into the fluid reservoir 25. Thus, the power cylinder 24 is activated to assist the steerage of front road wheels $FW_1$, $FW_2$.

During the steerage of front road wheels $FW_1$, $FW_2$, the cable 68 is pulled forward in accordance with the rightward displacement of rack bar 11 to rotate the cam plate 62 counterclockwise against the load of spiral spring 71. Thus, the pin 64 is moved by engagement with the cam groove 62a toward the center of cam plate 62 to cause rightward displacement of the connecting rod 61. In turn, the valve spool 42b is displaced rightward relatively to the valve sleeve 42a to permit the hydraulic fluid under pressure supplied from the inlet port 42c into the left-hand fluid chamber 35b of power cylinder 35 through the distribution port 42e and conduit $P_5$ and to permit the flow of hydraulic fluid discharged from the right-hand fluid chamber 35c of power cylinder 35 into the fluid reservoir 25 through the conduit $P_6$, distribution port 42f, exhaust port 42d and conduit $P_4$. Thus, the power cylinder 35 is activated to cause rightward displacement of the lateral rod 31 against the load of spring 36. The rightward displacement of lateral rod 31 is transmitted to the rear road wheels $RW_1$, $RW_2$ through the tie rods 33a, 33b and knuckle arms 34a, 34b to steer the rear road wheels leftward or in an opposite direction relative to the front road wheels $FW_1$, $FW_2$. Simultaneously, the rightward displacement of lateral rod 31 causes the swingable lever 43 to swing counterclockwise about the pin 44, and in turn, the valve sleeve 42a is displaced rightward to block the supply of hydraulic fluid under pressure into the power cylinder 35 and to block the discharge of hydraulic fluid from the power cylinder 35. As a result, the power cylinder 35 is deactivated to retain the lateral rod 31 in its displaced position thereby to arrest the steerage of front road wheels $FW_1$, $FW_2$. As is understood from the above description, the rear road wheels $RW_1$, $RW_2$ are steered in the opposite direction relative to the front road wheels $FW_1$, $FW_2$ in accordance with the rightward displacement of connecting rod 61 caused by rotation of the cam plate 62.

When the steering wheel 15 is turned leftward to steer the front road wheels $FW_1$, $FW_2$ in a leftward direction under activation of the power cylinder 24, the cable 67 is pulled forward in accordance with leftward displacement of the rack bar 11 to rotate the cam plate 62 clockwise against the load of spiral spring 71. Thus, the pin 64 is moved by engagement with the cam groove 62a in a direction apart from the center of cam plate 62 to cause leftward displacement of the connecting rod 61. In turn, the valve spool 42b is displaced leftward to permit the hydraulic fluid under pressure supplied from the inlet port 42c into the right-hand fluid chamber 35c of power cylinder 35 and to permit the flow of hydraulic fluid discharged from the left-hand fluid chamber 35b of power cylinder 35 into the fluid reservoir 25. Thus, the power cylinder 35 is activated to cause leftward displacement of the lateral rod 31 thereby to steer the rear road wheels $RW_1$, $RW_2$ in an opposite direction relative to the front road wheels $FW_1$, $FW_2$. The leftward movement of lateral rod 31 causes the swingable lever 43 to swing clockwise about the pin 44, and in turn, the valve sleeve 42a is displaced leftward to block the supply of hydraulic fluid under pressure into the power cylinder 35 and to block the discharge of hydraulic fluid from the power cylinder 35. As a result, the power cylinder 35 is deactivated to retain the lateral rod 31 in its displaced position thereby to arrest the steerage of rear road wheels $RW_1$, $RW_2$.

From the above description, it will be understood that the rear road wheels $RW_1$, $RW_2$ are steered in response to steerage of the front road wheels $FW_1$, $FW_2$ in an opposite direction relative thereto. The steering angle of rear road wheels $RW_1$, $RW_2$ is determined in accordance with a displacement amount of connecting rod 61 defined by rotation of the cam plate 62, as will be described below. When the rotation angle of cam plate 62 is less than a predetermined small angle, the connecting rod 61 is maintained in the neutral position to retain the rear road wheels $RW_1$, $RW_2$ in their neutral positions. (see FIG. 6) Assuming that the steering wheel 15 is turned at an angle less than 100° during travel of the vehicle at a high speed, for instance 70 km/h, the rear road wheels $RW_1$, $RW_2$ are retained in their neutral positions to ensure the travel stability of the vehicle.

When the rotation angle of cam plate 62 exceeds the predetermined small angle, the connecting rod 61 and valve spool 42b are displaced in accordance with the rotation angle of cam plate 62 defined by the steering amount of front road wheels $FW_1$, $FW_2$. Thus, the rear road wheels $RW_1$, $RW_2$ are steered at an angle in proportion to the displacement amount of connecting rod 61 and valve spool 42b. Assuming that the steering wheel 15 is turned at an angle of 100°–200° during travel of the vehicle at a medium speed, for instance 40–70 km/h, the displacement amount of connecting rod 61 relative to a unit steering amount of front road wheels $FW_1$, $FW_2$ is maintained in a small value, as shown by the solid characteristic line in FIG. 6. As a result, the steering angle of rear road wheels $RW_1$, $RW_2$ changes at a small rate to ensure the stable turning ability of the vehicle. Moreover, the steering angle of rear road wheels $RW_1$, $RW_2$ is controlled in a small value to ensure the travel stability of the vehicle.

When the steering wheel 15 is turned at an angle more than 200° during travel of the vehicle at a low speed, for instance less than 40 km/h, the displacement amount of connecting rod 61 relative to a unit steering amount of the front road wheels becomes large at two steps as shown by the solid characteristic line in FIG. 6. As a result, the rear road wheels $RW_1$, $RW_2$ are steered at a large angle to enhance the smaller turning ability of the vehicle during low speed travel. When the steering wheel 15 is returned to its neutral position, the pulling force acting on the cable 67 or 68 is released, and the cam plate 62 is returned to the initial position under the load of spiral spring 71 to return the connecting rod 61 and valve spool 42b to their neutral positions. Thus, the spool valve 42, power cylinder 35 and swingable lever 43 are returned to their neutral positions, and the steering angle of rear road wheels $RW_1$, $RW_2$ becomes zero.

Assuming that the cancel switch 52 is closed to energize the solenoid 51a, the changeover valve 51 is maintained in the second condition to provide a direct fluid communication between conduits $P_3$ and $P_4$. Thus, the hydraulic fluid discharged from pump 22 circulates into the fluid reservoir 25 through the flow dividing valve 23 and conduits $P_3$, $P_4$. In such a condition, the lateral rod 31 is retained in the neutral position under the load of spring 36 to retain the rear road wheels $RW_1$, $RW_2$ in their neutral positions irrespectively of steerage of the front road wheels.

Although in the rear wheel steering mechanism B the cam groove 62a of plate 62 is formed to change the steering angle of the rear road wheels relative to the turn angle of the steering wheel at four steps, it may be formed to change the steering angle of the rear road wheels at five or six steps or to smoothly change the steering angle of the rear road wheels.

Figure 7:
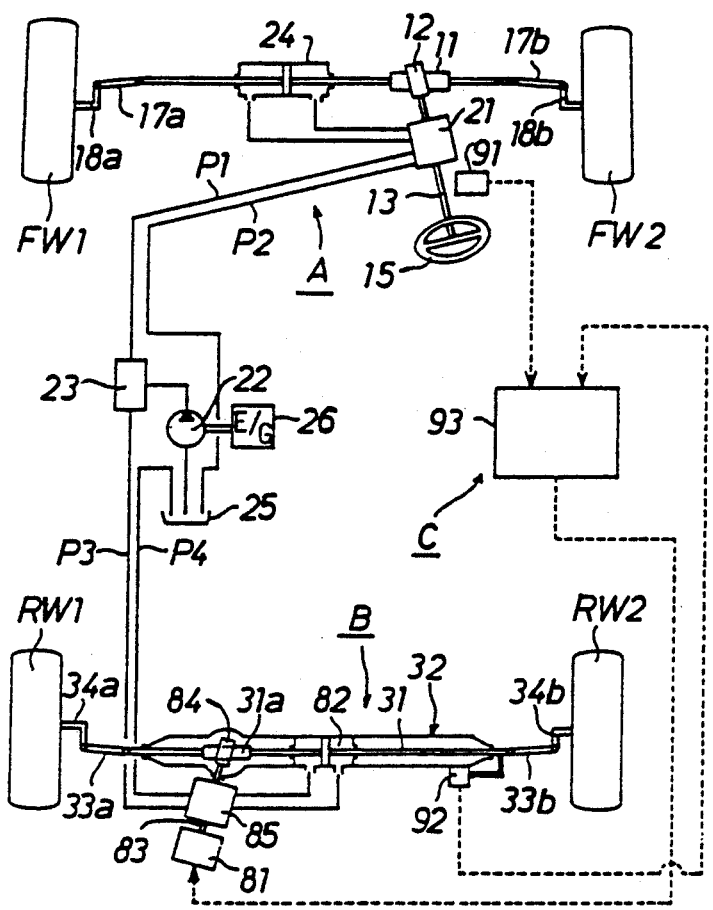
FIG. 7 is a schematic plan view of a modification of the four-wheel steering system shown in FIG. 1.

The four-wheel steering system may be modified as shown in FIG. 7, wherein the rear wheel steering mechanism B is arranged to steer the rear road wheels $RW_1$, $RW_2$ under control of an electric control apparatus C. In this modification, the bevel gears 14 in the front wheel steering mechanism A and the cables 67, 68 between the steering mechanisms A and B are eliminated. In the modified rear wheel steering mechanism B, an electric motor 81 and a power cylinder 82 are provided to cause axial displacement of the lateral rod 31. The electric motor 81 is mounted on a steering shaft 83 which is provided at its lower end with a pinion 84 in mesh with a rack part 31a of the lateral rod 31. The steering shaft 83 is provided thereon with a control valve 85 which is responsive to a steering torque applied thereto through steering shaft 83 to control the supply of hydraulic fluid under pressure into the power cylinder 82 and the discharge of hydraulic fluid from the power cylinder 82. The other construction and component parts of the steering mechanisms A and B are substantially the same as those shown in FIG. 1.

Figure 8:
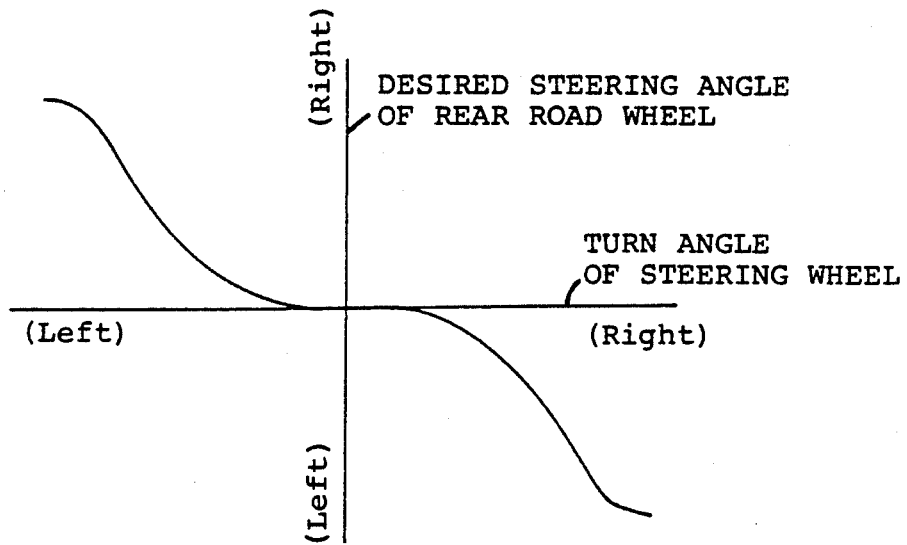
FIG. 8 is a graph showing a relationship between a turn angle of a steering wheel and a desired steering angle of rear road wheels.

The electric control apparatus C includes a first sensor 91 for detecting a turn angle of the steering wheel 15, a second sensor 92 for detecting a steering angle of the rear road wheels $RW_1$, $RW_2$, and an electric control circuit 93. The first sensor 91 is mounted on the steering shaft 13 to produce an electric signal indicative of the turn angle of steering wheel 15. The second sensor 92 is mounted on the housing 32 of rear wheel steering mechanism 3 to detect axial displacement of the lateral rod 31 thereby to produce an electric signal indicative of the steering angle of rear road wheels $RW_1$, $RW_2$. The electric control circuit 93 is in the form of a microcomputer which is responsive to the electric signal from the first sensor 91 to determine a desired steering angle of the rear road wheels based on a turn angle of the steering wheel and responsive to the electric signal from the second sensor 92 to control the rotation of electric motor 81 in such a manner that the steering angle of the rear road wheels becomes the desired steering angle. In a practical embodiment, the microcomputer is arranged to store therein such a characteristic data as shown in FIG. 8 to determine the desired steering angle of the rear road wheels.

Assuming that in operation, the steering wheel 15 is turned to steer the front road wheels $FW_1$, $FW_2$, the electric motor 81 is operated under control of the electric control circuit 93 in such a manner that the power cylinder 82 is activated under control of the control valve 85 to steer the rear road wheels at the desired steering angle. If the turn angle of the steering wheel 15 is less than a predetermined value, for instance 100, the rear road wheels are retained in their neutral positions since the desired steering angle is determined to be zero as shown in FIG. 8. When the turn angle of the steering wheel exceeds the predetermined value, the rear road wheels are steered at the desired angle in an opposite direction relative to the front road wheels since the desired steering angle is determined to increase in accordance with an increase of the turn angle of the steering wheel.

Having now fully set forth both structure and operation of preferred embodiments of the concept underlying the present invention, various other embodiments as well as certain variations and modifications of the embodiments shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. A four-wheel steering system for an automotive vehicle having a pair of dirigible front road wheels and a pair of dirigible rear road wheels, comprising a front wheel steering mechanism operable in response to a steering effort applied thereto to steer the front road wheels, a rear wheel steering mechanism arranged to steer the rear road wheels in response to steerage of the front road wheels, and a control apparatus arranged to control said rear wheel steering mechanism in such a manner that the rear road wheels are retained in their neutral positions when the front road wheels are steered at an angle less than a predetermined small angle and that the rear road wheels are steered in an opposite direction relative to the front road wheels when the front road wheels are steered at a larger angle than the predetermined small angle, wherein said control apparatus is arranged to control said rear wheel steering mechanism in such a manner that a changing rate of the rear wheel steering angle per a unit steering angle of the front road wheels increases in accordance with an increase of the front wheel steering angle.

2. A four-wheel steering system as claimed in claim 1, wherein said rear wheel steering mechanism includes a housing for mounting on a body structure of the vehicle, said housing containing therein a hydraulic power cylinder, a lateral rod axially slidably carried on said housing for operative connection at opposite ends thereof to the dirigible rear road wheels, and a piston axially slidably disposed within said power cylinder to form a pair of fluid chambers and being fixed to said lateral rod for axial movement therewith, and wherein said control apparatus comprises a spool valve assembly including a valve sleeve axially slidably disposed within said housing and being operatively connected to said lateral rod and a valve spool axially slidably disposed within said valve sleeve and cooperable with said valve sleeve to selectively supply hydraulic fluid under pressure into the fluid chambers of said power cylinder, and cam means including a cam plate rotatably mounted within said housing and being operatively connected to said front wheel steering mechanism to be rotated in response to steerage of the dirigible front road wheels, said cam plate formed with a spiral cam groove in engagement with a cam pin operatively connected to said valve spool, and said spiral cam groove having a profile defined to axially displace said valve spool in such a manner that the rate of axial displacement of said valve spool per a unit rotation angle of said cam plate increases at a plurality of steps.

3. A four-wheel steering system as claimed in claim 1, wherein said rear wheel steering mechanism includes a housing for mounting on a body structure of the vehicle, said housing containing therein a hydraulic power cylinder, a lateral rod axially slidably carried on said housing for operative connection at opposite ends thereof to the dirigible rear road wheels, and a piston axially slidably disposed within said power cylinder to form a pair of fluid chambers and being fixed to said lateral rod, and wherein said control apparatus comprises a steering shaft in drive connection to said lateral rod, an electric motor arranged to drive said steering shaft, a control valve provided on said steering shaft, said control valve being responsive to rotation of said steering shaft to selectively supply hydraulic fluid under pressure into the fluid chambers of said power cylinder, and an electric control apparatus arranged to operate said electric motor in such a manner that said power cylinder is activated under control of said control valve to non-linearly increase the rear wheel steering angle in accordance with an increase of the front wheel steering angle.

4. A four-wheel steering system as claimed in claim 2, wherein said spool valve assembly and said cam means are arranged in parallel with said hydraulic power cylinder and said lateral rod within said housing.

* * * * *